United States Patent
Carr

(10) Patent No.: US 7,487,510 B1
(45) Date of Patent: *Feb. 3, 2009

(54) METHOD AND APPARATUS TO ISOLATE CHANGES IN REMOTING SYSTEM CLIENTS

(75) Inventor: Harold Carr, Salt Lake City, UT (US)

(73) Assignee: Sun Microsystems, Inc., Santa Clara, CA (US)

( * ) Notice: Subject to any disclaimer, the term of this patent is extended or adjusted under 35 U.S.C. 154(b) by 577 days.

This patent is subject to a terminal disclaimer.

(21) Appl. No.: 10/863,094

(22) Filed: Jun. 8, 2004

Related U.S. Application Data

(63) Continuation-in-part of application No. 10/677,434, filed on Oct. 2, 2003.

(60) Provisional application No. 60/563,872, filed on Apr. 20, 2004, provisional application No. 60/466,623, filed on Apr. 30, 2003.

(51) Int. Cl.
 *G06F 3/00* (2006.01)
 *G06F 15/16* (2006.01)

(52) U.S. Cl. ............ 719/313; 709/217; 709/227; 709/231

(58) Field of Classification Search ......... 709/201–207, 709/217–219, 225–237; 719/311–318, 328–332; 718/106
See application file for complete search history.

(56) References Cited

U.S. PATENT DOCUMENTS

| | | | |
|---|---|---|---|
| 6,173,327 B1 * | 1/2001 | De Borst et al. | 709/231 |
| 6,272,557 B1 * | 8/2001 | Lim et al. | 719/315 |
| 6,282,581 B1 * | 8/2001 | Moore et al. | 719/316 |
| 6,351,749 B1 | 2/2002 | Brown et al. | |
| 6,418,422 B1 | 7/2002 | Guenther et al. | |
| 6,446,137 B1 * | 9/2002 | Vasudevan et al. | 719/330 |
| 6,817,009 B2 | 11/2004 | Flanagan et al. | |
| 6,820,261 B1 | 11/2004 | Bloch | |
| 7,028,312 B1 | 4/2006 | Merrick et al. | |
| 7,089,567 B2 | 8/2006 | Girardot et al. | |

(Continued)

OTHER PUBLICATIONS

Roberto Chinnici, Java™ API for XML-based RPC JAX-RPC 1.1-JSR-101 Java Community Proces (JCP), Sun Microsystems, Apr. 11, 2003, (166 pages).

(Continued)

*Primary Examiner*—Meng-Ai An
*Assistant Examiner*—Charles E Anya
(74) *Attorney, Agent, or Firm*—Robert C. Kowert; Meyertons, Hood, Kivlin, Kowert & Goetzel, P.C.

(57) ABSTRACT

Method and apparatus for dynamically and adaptively alternating encodings, protocols, and/or transports in remoting system clients. Embodiments may provide a mechanism or mechanisms to isolate encoding, protocol, and/or transport changes in remoting system clients. In a remoting system, a server may make its service(s) available via multiple encoding, protocol and transport (EPT) combinations. One embodiment may provide a mechanism that enables a remoting system client to select an EPT combination for sending messages to a server, to have that choice drive the creation of objects and/or interface instances on the remoting system client used in the message exchange, and to switch to a different EPT combination on the remoting system client if necessary or desired. Embodiments may be used in all types of remoting systems and/or in other computing environments including, but not limited to, peer-to-peer environments.

48 Claims, 7 Drawing Sheets

U.S. PATENT DOCUMENTS

| | | | |
|---|---|---|---|
| 7,139,811 B2 * | 11/2006 | Lev Ran et al. | 709/217 |
| 2002/0116454 A1 * | 8/2002 | Dyla et al. | 709/203 |
| 2002/0120428 A1 | 8/2002 | Christiaens | |
| 2003/0149741 A1 | 8/2003 | Krooss et al. | |
| 2003/0172110 A1 * | 9/2003 | Kunisetty | 709/203 |
| 2004/0158589 A1 | 8/2004 | Liang et al. | |
| 2004/0267933 A1 * | 12/2004 | Przybylski et al. | 709/227 |
| 2007/0150546 A1 * | 6/2007 | Karakashian et al. | 709/207 |

OTHER PUBLICATIONS

Bill Venners, "Jini Extensible Remote Invocation—A Conversation with Bob Scheifler, Part VI," Artima Developer, Aug. 12, 2002, (7 pages).

Douglas C. Schmidt, "The Adaptive Communication Environment—An Object Oriented Network Toolkit for Developing Communication Software," http//:www.cs.wustl.edu/~schmidt/, Department of Computer Science, (25 pages).

Java To IDL Language mapping Specification, Version 1.3, Sep. 2003; Object Management Group, http://www.omg.org/docs/formal/03-09-04.pdf.

U.S. Appl. No. 11/117,023, filed Apr. 28, 2005.

U.S. Appl. No. 11/117,267, filed Apr. 28, 2005.

Domani, et al., "Thread-Local Heaps for Java", IBM Haifa Research Laboratory, Mount Carmel, ACM 2002, pp. 76-87.

* cited by examiner

METHOD AND APPARATUS TO ISOLATE CHANGES IN REMOTING SYSTEM CLIENTS

PRIORITY INFORMATION

This application is a continuation-in-part of U.S. patent application Ser. No. 10/677,434, titled "System and Methods Employing a PEPt Architecture for RPC" filed Oct. 2, 2003, whose inventor is Harold Carr, which is hereby incorporated by reference in its entirety, and which claims benefit of priority of provisional application Ser. No. 60/466,623 entitled "System and Methods Employing a PEPt Architecture for RPC" filed Apr. 30, 2003, whose inventor is Harold Carr.

This application also claims benefit of priority of provisional application Ser. No. 60/563,872 entitled "Method and Apparatus to Isolate Changes in Remoting Systems" filed Apr. 20, 2004, whose inventor is Harold Carr.

BACKGROUND OF THE INVENTION

1. Field of the Invention

This invention relates to computer software, and more particularly to the client side of remoting systems such as Remote Procedure Call (RPC) and messaging systems.

2. Description of the Related Art

Remoting systems make it easier for programmers to write distributed applications. Some types of remoting systems are RPC, messaging, media streaming and group communication. RPC (or Remote Method Invocation—RMI) systems have a programming model where one invokes a method on a remote object just as one invokes a method on a local object. The details of the communication are handled by the remoting infrastructure. Messaging systems are programmed by adding data to a message structure and then giving that structure to the messaging system infrastructure to send to the receiver. Again, the details are handled by the infrastructure.

There are numerous RPC and messaging systems in existence. For example, Java specifies the RMI, JavaIDL, RMI-IIOP, and JAX-RPC RPC systems, and the JMS and JAXM messaging systems. In Java, to communicate using the WS-I profile, the JAX-RPC programming model is used. To communicate using IIOP, RMI-IIOP is used.

Remoting systems (e.g., RPC and Messaging systems) may need or desire to support alternate encodings, protocols and/or transports (EPTs), either because of evolving standards or through dynamic negotiation with a peer. Users of a remoting system do not want to be concerned with such details nor have to change programming models just to use a different protocol. The users want to concentrate on the data being sent.

Remote Procedure Call (RPC)

Remote Procedure Call (RPC) is a protocol that one program can use to request a service from a program located in another computer in a network without having to understand network details. A procedure call is also sometimes referred to as a function call or a subroutine call. RPC uses the client/server model. The requesting program is a client and the service-providing program is the server. Similar to a regular or local procedure call, an RPC is a synchronous operation requiring the requesting program to be suspended until the results of the remote procedure are returned. However, the use of lightweight processes or threads that share the same address space allows multiple RPCs to be performed concurrently.

When program statements that use RPC are compiled into an executable program, a stub is included in the compiled code that acts as the representative of the remote procedure code. When the program is run and the procedure call is issued, the stub receives the request and forwards it to a client runtime program in the local computer. The client runtime program has the knowledge of how to address the remote computer and server application and sends the message across the network that requests the remote procedure. Similarly, the server includes a runtime program and tie that interface with the remote procedure itself. Results are returned in a similar way.

JAX-RPC (Java API for XML-Based RPC) is an application program interface (API) in the Java Web Services Developer Pack (WSDP) that enables Java developers to include remote procedure calls (RPCs) with Web services or other Web-based applications. JAX-RPC is aimed at making it easier for applications or Web services to call other applications or Web services. JAX-RPC provides a programming model for the development of SOAP (Simple Object Access Protocol)-based applications. The JAX-RPC programming model simplifies development by abstracting SOAP protocol-level runtime mechanisms and providing mapping services between Java and the Web Services Description Language (WSDL).

The specification and implementation of Remote Procedure Call (RPC) systems have retread the same ground in many forms, from DCE, to distributed versions of C++, to COM/DCOM, CORBA, RMI and RMI-IIOP, to the more recent XML-RPC and SOAP. The specification and implementation of these systems seems to traverse the same ground repeatedly.

SUMMARY

Embodiments of a method and apparatus for dynamically and adaptively alternating encodings, protocols, and/or transports in the client side of remoting systems (e.g., Remote Procedure Call (RPC) systems and messaging systems in general) are described. Embodiments may provide a mechanism or mechanisms for encoding, protocol and/or transport extensibility in remoting system clients and to isolate encoding, protocol, and/or transport changes in remoting system clients. One embodiment may provide a mechanism to isolate encoding changes in remoting system clients. The mechanism may enable a message exchange to dynamically change the encoding in use without the need to change other parts of the remoting system client such as presentation, protocols and/or transport. One embodiment may provide a mechanism to isolate protocol changes in remoting system clients. The mechanism may enable a message exchange to dynamically change the protocol in use without the need to change other parts of the remoting system client such as presentation, encoding and/or transport. One embodiment may provide a mechanism to isolate transport changes in remoting system clients. The mechanism may enable a message exchange to dynamically change the transport in use without the need to change other parts of the remoting system client such as presentation, encoding, and/or protocol.

In a remoting system, a server may make its service(s) available via multiple encoding, protocol and transport (EPT) combinations. One embodiment may provide a mechanism that enables a remoting system client to select an EPT combination for sending messages to a server, for example to remotely invoke procedures on the server, and for receiving response messages, if any, from the server, and to have the choice drive the creation of objects and/or interface instances used by the remoting system client in the message exchange. One embodiment may provide client-side encoding, protocol and transport extensibility for remoting systems through a Contact Information (ContactInfo, for short) mechanism on the client side of the remoting system. Embodiments of a ContactInfo mechanism may enable support of alternate EPTs on the client side of remoting systems transparent to a programming model, and may be used as a basis for handling fail-over and load balancing. Embodiments may represent each EPT combination supported by a peer (e.g., a server) as a ContactInfo object in a list of ContactInfos on the remoting system client. When a message is to be sent, one of these ContactInfo objects may be chosen by the remoting infrastructure. In one embodiment, the chosen ContactInfo object acts as a factory for specific encoders, protocol handlers and connections. If communication fails, another ContactInfo may be chosen. Embodiments of the ContactInfo mechanism may be used, for example, to adaptively alternate between XML and binary encoding, protocol and transport combinations on a remoting system client. The ContactInfo mechanism isolates change from the remoting system user while allowing a common remoting infrastructure to be reused.

Embodiments of the client-side mechanism may be used to isolate EPT combination changes on remoting system clients implemented according to various remoting system architectures including, but not limited to, a Presentation, Encoding, Protocol and transport (PEPt) remoting architecture. While embodiments are primarily described herein in the context of RPC and messaging remoting systems, it is important to note that embodiments may be used in all types of remoting systems including, but not limited to, RPC, messaging, media streaming and group communication remoting systems, as well as in other computing environments including, but not limited to, peer-to-peer environments.

Figure 1:
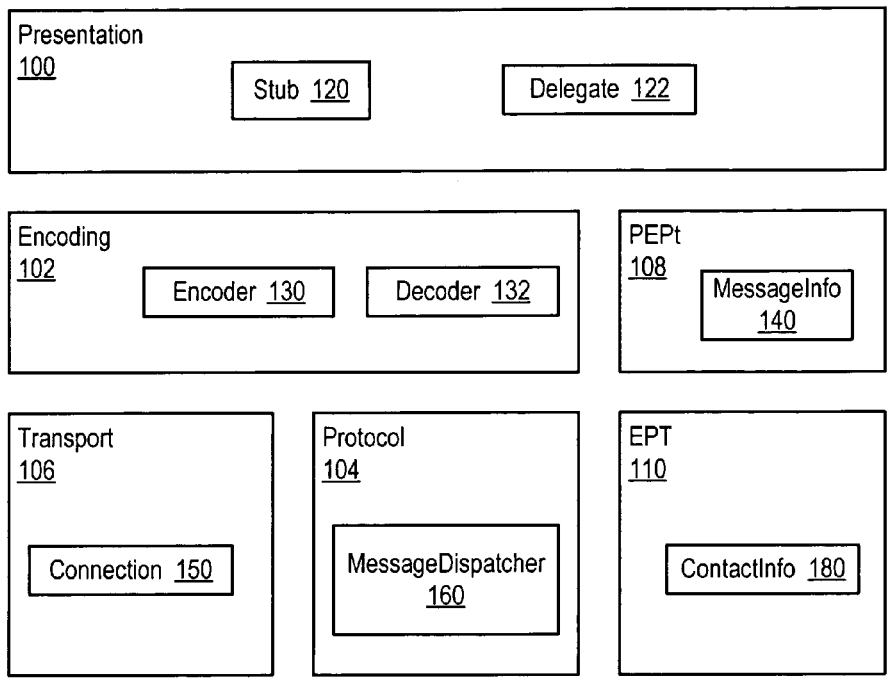
FIG. 1 illustrates a block-level view of an exemplary PEPt client-side architecture including a ContactInfo mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for dynamically and adaptively alternating encodings, protocols, and/or transports in the client side of remoting systems (e.g., Remote Procedure Call (RPC) systems and messaging systems in general) are described. Embodiments may provide a mechanism or mechanisms for encoding, protocol and/or transport extensibility in remoting system clients and to isolate encoding, protocol, and/or transport changes in remoting system clients. One embodiment may provide a mechanism to isolate encoding changes in remoting system clients. The mechanism may enable a message exchange to dynamically change the encoding in use without the need to change other parts of the remoting system client such as presentation, protocols and/or transport. One embodiment may provide a mechanism to isolate protocol changes in remoting system clients. The mechanism may enable a message exchange to dynamically change the protocol in use without the need to change other parts of the remoting system client such as presentation, encoding and/or transport. One embodiment may provide a mechanism to isolate transport changes in remoting system clients. The mechanism may enable a message exchange to dynamically change the transport in use without the need to change other parts of the remoting system client such as presentation, encoding, and/or protocol.

In a remoting system, a server may make its service(s) available via multiple encoding, protocol and transport (EPT) combinations. One embodiment may provide a mechanism or mechanisms that enables a remoting system client to select an EPT combination for sending messages to a server to remotely invoke procedures of the server's service(s) and for receiving response messages from the server, if any, and to have the choice drive the creation of objects and/or interface instances used by the remoting system client in the message exchange. One embodiment may provide client-side (a client is the party or peer initiating the communication in a remoting system) encoding, protocol and transport extensibility for remoting systems through a Contact Information (ContactInfo, for short) mechanism on the client side of the remoting system. Embodiments of a ContactInfo mechanism may enable support of alternate EPTs on the client side of remoting systems transparently to a programming model, and may be used as a basis for handling fail-over and load balancing. Embodiments may represent each EPT combination supported by a peer (e.g., a server) as a ContactInfo object in a list of ContactInfos on the remoting system client. When a message is to be sent, one of these ContactInfo objects may be chosen by the remoting infrastructure. In one embodiment, the chosen ContactInfo object acts as a factory for specific encoders, protocol handlers (which may be referred to as MessageDispatchers on the client side) and connections. If communication fails, another ContactInfo may be chosen. Embodiments of the ContactInfo mechanism may be used, for example, to adaptively alternate between XML and binary encoding, protocol and transport combinations on a remoting system client. The ContactInfo mechanism isolates change from the remoting system user while allowing a common remoting infrastructure to be reused.

Through embodiments, it is not necessary to have different programming models in a remoting system client just to use different EPT combinations. This may be accomplished on the client side by using ContactInfo as a factory for specific EPT combinations to send and receive messages to and from a server While embodiments are primarily described herein in the context of RPC and messaging remoting systems, it is important to note that embodiments may be used in all types of remoting systems including, but not limited to, RPC, messaging, media streaming and group communication remoting systems.

Also note that, while embodiments of the system and method for dynamically and adaptively alternating encodings, protocols, and/or transports on remoting system clients, are generally described for client-server environments, embodiments may also be used in other computing environments, such as in peer-to-peer environments, to provide dynamic alternating of encodings, protocols, and/or transports for messaging between peers in the peer-to-peer environment.

Client-Side ContactInfo Mechanism

Embodiments of a client-side mechanism that may allow a programmer to concentrate on the data being sent to a remote destination are described. The details of how that data is encoded and sent should not be an issue. The programmer should not need to change programming models just to use a different protocol. That should be handled by the infrastructure. In one embodiment, a client-side ContactInfo mechanism may enable adaptive EPTs and isolate change from the presentation block (i.e., the programmer using the remoting system). Embodiments of the ContactInfo mechanism may be used as an extensibility mechanism for remoting system client-side architectures such as the exemplary Presentation, Encoding, Protocol and transport (PEPt) client-side remoting system architecture described below.

ContactInfo is a client-side (the role initiating the communication) mechanism that enables a single programming model to be used to communicate over a variety of encodings, protocols and transports (EPTs). ContactInfo may be used to structure new remoting system clients and/or to enable existing remoting system clients to support evolving standards (e.g., JAX-RPC switching from SOAP-encoding to Doc-Literal) or a non-standard EPT such as JAX-FAST.

The following describes how ContactInfo relates to other middleware systems, how ContactInfo may be used in an exemplary Presentation, Encoding, Protocol and transport (PEPt) client-side remoting architecture, and how ContactInfo operates when handling a message in a remoting system client. Also described is a mechanism for selecting a ContactInfo object from a list of ContactInfo objects, and how the chosen ContactInfo acts as a factory for other PEPt interface instances. After describing how ContactInfo works, exemplary performance results of using ContactInfo to support CDR over IIOP, SOAP over HTTP and an ASN.1 binary XML encoding are described.

Embodiments of a ContactInfo mechanism as described herein may be used, for example, as the client-side configuration point of a Presentation, Encoding, Protocol and transport (PEPt) remoting architecture. The PEPt architecture may allow the user to understand, use and implement remoting system clients by providing a simple but comprehensive framework in which to place finer-grained details of distributed communications systems. The PEPt architecture may serve as a core, high-level remoting system architecture, and may provide a basis for understanding and implementing remoting systems. The PEPt remoting architecture primarily focuses on a high-level architecture in order to guide the overall structuring of a remoting system, including remoting system clients as described herein. The PEPt remoting architecture identifies the top-level "blocks" of a remoting system client, and shows how those blocks may interact to adaptively support alternate encodings, protocols and transports. The PEPt remoting architecture defines important interactions in a remoting system client, such as how two binding objects interact. Embodiments of the PEPt architecture are further described in U.S. patent application Ser. No. 10/677,434, titled "System and Methods Employing a PEPt Architecture for RPC" which is hereby incorporated by reference in its entirety.

The SOAP and WSDL specifications, for example, allow the specification of different transports and encodings. The PEPt remoting architecture is an architecture in which such specifications may be implemented. In a remoting system client implemented according to the PEPt architecture, an embodiment of the ContactInfo mechanism may be used in the binding role of specifying which parts of the communications infrastructure to use on a particular message. The ContactInfo mechanism may be used in remoting system clients implemented according to the PEPt architecture to dynamically select EPT combinations for particular messages and as a factory for dynamically constructing components to support selected EPT combinations.

FIGS. 1-11 illustrate means for determining two or more encoding, protocol, and transport (EPT) combinations supported by a destination for messages (e.g., a remoting system server), means for selecting one of the EPT combinations for transmitting a particular message to the destination, means for transmitting the particular message to the destination according to the selected EPT combination, and means for switching to a different EPT combination to transmit a different message to the destination in remoting system clients.

FIG. 1 illustrates a block-level view of an exemplary PEPt client-side architecture including a ContactInfo mechanism according to one embodiment. The PEPt architecture defines the fundamental building blocks of remoting systems to be: Presentation 100, Encoding 102, Protocol 104, and transport 106. Presentation 100 may encompass the data types and APIs available to a programmer. Encoding 102 describes or encodes the representation of those data types on the wire via an encoder 130, and may also decode encoded data types received on the wire for presentation 100 via a decoder 132. Protocol 104 frames the data encoding to denote the intent of the message. Transport 106 may move the encoding and protocol from one location to another. ContactInfo 180 may serve as a factory for specific instances of interfaces in one or more of the blocks. While the ContactInfo mechanism is primarily described herein in the context of an exemplary PEPt client-side remoting architecture, note that embodiments of a ContactInfo mechanism may also be used in other remoting architectures.

The PEPt remoting architecture provides a definition of the fundamental blocks of remoting system clients. These blocks may be used to partition a remoting system client infrastructure to enable the remoting system client to support multiple EPTs while giving the ability to reuse common infrastructure (e.g., thread and connection pools). ContactInfo may be used in a remoting system client implemented according to the PEPt remoting architecture as a factory for specific instances of interfaces in each block. In one embodiment, the role of the blocks in FIG. 1 may be defined as:

The presentation block 100 includes the APIs used to interact with a remoting system (e.g., stubs), the data types that may be transferred, and error reporting.

The encoding block 102 denotes the "wire" representation of presentation data types and the conversion process from language representation to wire representation.

The protocol block 104 is responsible for "framing" the encoded data and to indicate the intent of the message.

The transport block 106 moves a message (i.e., the encoded data and protocol framing) from one location to another.

The PEPt 108 block is involved in all aspects of the remoting infrastructure, while the EPT block 110 includes ContactInfo 180, which is the factory for encoding, protocol and transport interface instances.

A programmer may interact with a remoting system client through a client-side stub 120, although the work of a stub may also be done "by hand". Stub 120, if present, may convert local procedure calls to remote procedure calls. The API used to obtain and manipulate stub 120 may be part of Presentation 100. Connection 150 is the interface used to transport requests and replies. In one embodiment, protocol framing may be handled by the Protocol 100 MessageDispatcher 160 interface (the MessageDispatcher may also be referred to as a protocol handler). In one embodiment, MessageDispatcher 160 may be responsible for managing necessary headers (and trailers if present), and for giving the output object's internal encoded data buffers to Transport 106 to be sent on the wire.

A client-side programmer may access or interface with a remoting system client by way of a Stub 120 (e.g., for RPC) or a Delegate 122 and MessageInfo 140 (for Messaging). In a messaging remoting system, the Delegate 122 is the access point for the remoting infrastructure, and the MessageInfo 140 is the place where data is placed for sending (and receiving). The Stub 120 is an adapter that hides the Delegate 122 and MessageInfo 140. The Stub 120 transforms a method invocation into a messaging operation by placing the method arguments into the MessageInfo 140 and then using the Delegate 122 to send the message.

ContactInfo 180 represents the address and EPT capabilities of the destination (e.g., a server). If the destination has multiple addresses and/or EPT capabilities, there may be multiple ContactInfos 180 associated with that destination, and a specific ContactInfo 180 may be selected for use with a particular message. In one embodiment, once a specific ContactInfo 180 is selected for sending a message, that ContactInfo 180 may be a factory for generating one or more messaging infrastructure interfaces. For example, ContactInfo 180 may act as a factory for generating an Encoder 130 (and Decoder 132, if a reply is expected) for the specific encoding in the EPT represented by the selected ContactInfo 180. As another example, ContactInfo 180 may act as a factory for generating the specific MessageDispatcher 160 that handles the protocol and the specific transport Connection 150. In embodiments, ContactInfo 180 may act as a factory for generating other infrastructure interfaces and/or structures.

The following describes how the ContactInfo mechanism may operate in the context of sending a message and receiving a reply in a remoting system client according to one embodiment.

The following describes bootstrapping ContactInfo, and describes how a ContactInfo, such as ContactInfo 180 of FIG. 1, may be generated. A destination (e.g., a server) may be reachable in multiple ways, remotely and/or locally. For example, a destination may be remotely reachable via CDR (Common Data Representation) over IIOP or SOAP over HTTP and locally reachable via shared memory or Solaris Doors. The destination may advertise these capabilities (and the addresses of those capabilities), for example by placing that information in an object reference or perhaps by making the information available in a registry.

Figure 2:
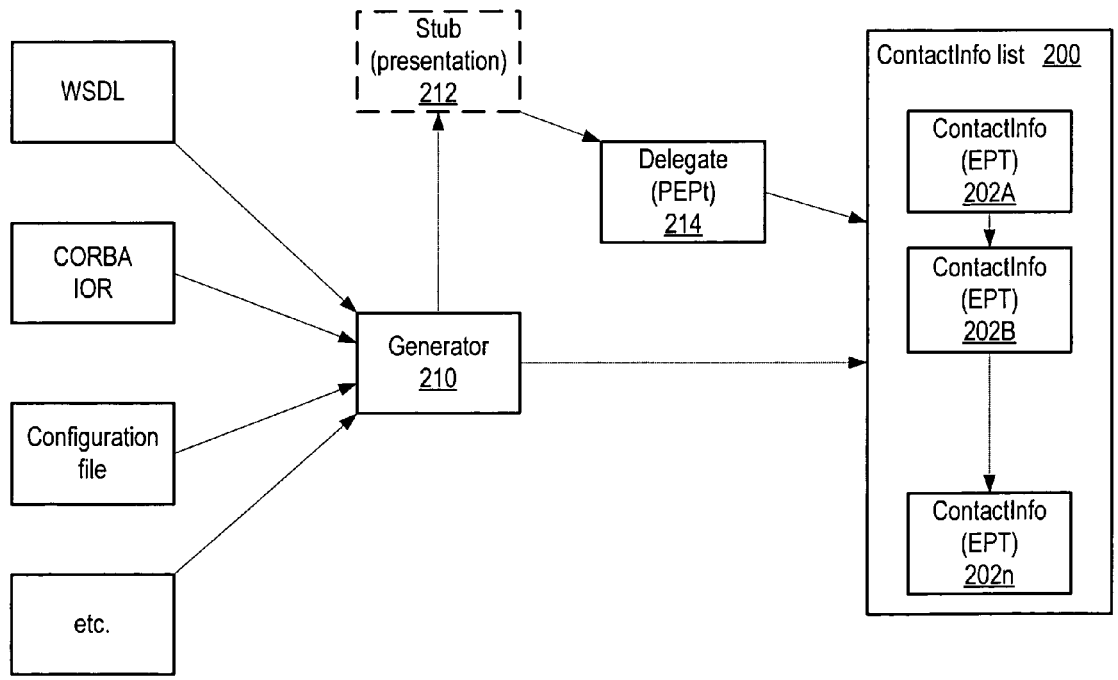
FIG. 2 illustrates generation of a list of ContactInfos in a remoting system client according to one embodiment.

In one embodiment, a generator 210 tool may be responsible for reading the reference or registry (or other configuration data) and creating a list 200 or set of one or more ContactInfos 202 in a remoting system client, as shown in FIG. 2. The generator 210 creates one ContactInfo 202 object for each EPT advertised by the destination. The generator 210 may also generate a Stub 212 (to adapt to the messaging model) if an RPC remoting system is being used. Note that, while the ContactInfos are described herein as being generated and maintained in a "list", it is to be understood that "list" is not to be limiting to a particular data structure such as an ordered or random list or linked list. One skilled in the art will recognize that objects such as ContactInfo objects may be generated and maintained in many different types of data structures, sets, lists, queues, containers, directory structures, etc.

For the rest of this discussion, the ContactInfo mechanism is described in relation to the messaging model of remoting systems, since RPC may be regarded as a "layer" on top of the messaging model.

The Delegate 214 contains the APIs used by the programmer (or Stub 212) to carry out communication. The programmer (or Stub 212) interacts with the Delegate 214 to obtain a MessageInfo (not shown in FIG. 2) in which to place data to send to the destination, as shown in FIG. 3.

Figure 3:
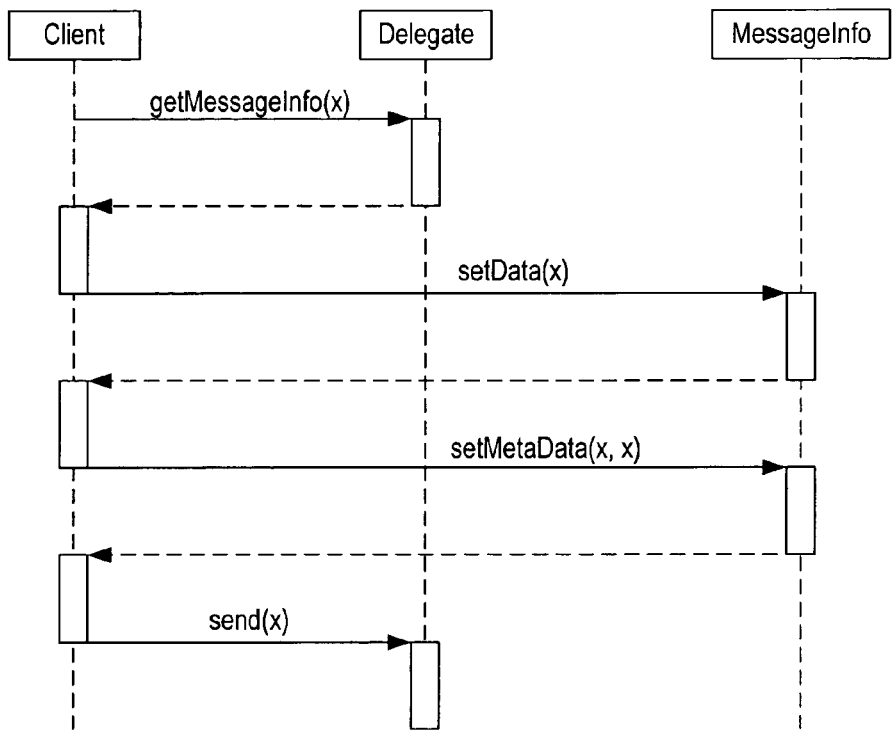
FIG. 3 illustrates interaction with a Delegate in a remoting system client to obtain a MessageInfo in which to place data to send to a destination according to one embodiment.

FIG. 3 illustrates a mechanism for placing both data and metadata in the MessageInfo of a remoting system client according to one embodiment. In one embodiment, a remoting system client may first get a MessageInfo from a Delegate and then set the data and metadata in the MessageInfo. The programmer (or Stub) then calls "send" on the Delegate. In one embodiment, the specific types of data and the kinds of metadata need to be generic since a specific ContactInfo has not yet been chosen. In this embodiment, MessageInfo is populated before a specific ContactInfo is chosen to keep information as generic as possible until as late as possible. However, note that, in another embodiment, the ContactInfo may be chosen before MessageInfo population.

Selecting a ContactInfo facilitates client-side extensibility in the PEPt architecture. In one embodiment, PEPt provides the ability to plug in an alternate ContactInfo selector mechanism to allow a system to vary its selection policies. The main constraint on a selector is that it must have global knowledge of all possible ContactInfo types (i.e., EPTs). One embodiment may provide a generic selector by defining a ContactInfo query or rating system to obviate the need for global knowledge.

Figure 4:
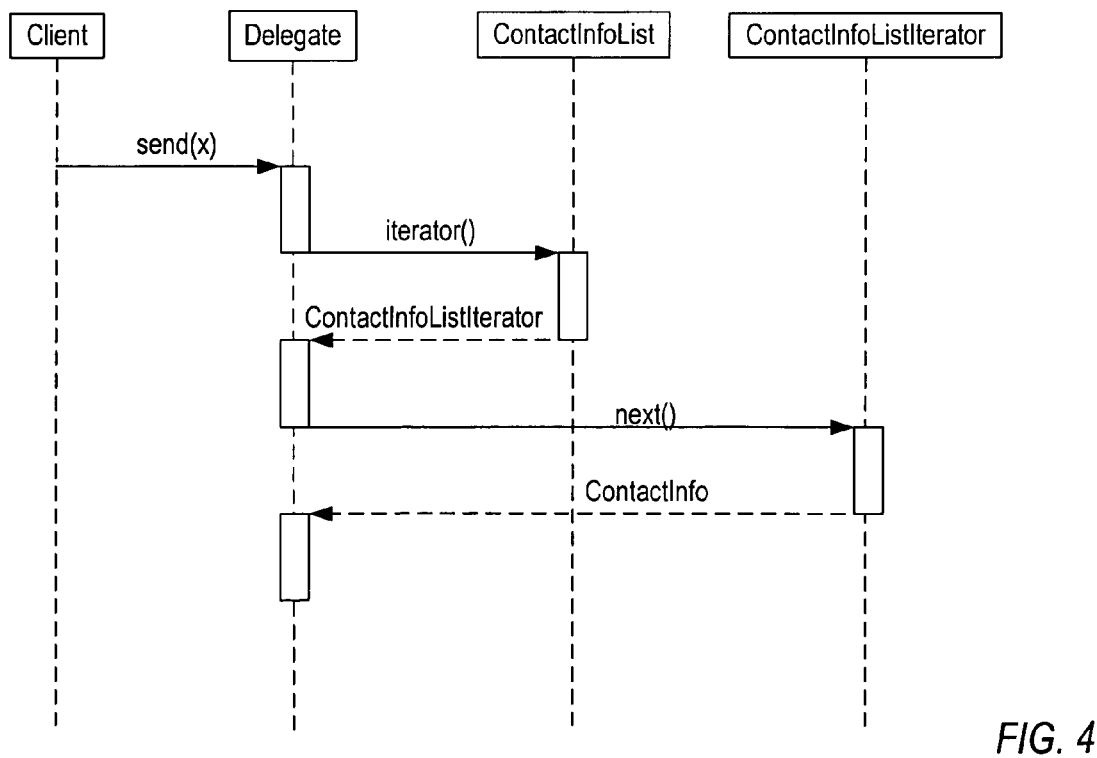
FIG. 4 illustrates the process of selecting a ContactInfo in a remoting system client according to one embodiment.

FIG. 4 shows a ContactInfo selection process in a remoting system client according to one embodiment. In one embodiment, a ContactInfo is chosen after the data to be sent has been placed in the MessageInfo and the programmer (or Stub) calls "send" on the Delegate. In one embodiment, a selector is encapsulated in an iterator obtained from the ContactInfo List (e.g. ContactInfo list 200 of FIG. 2). The (generic) Delegate's function is to call "next" on the iterator to obtain a specific ContactInfo. The details of how "next" is determined may be hidden in the iterator. The selection function may range from selecting the first ContactInfo in the list to more sophisticated load-balancing and quality-of-service mechanisms.

In one embodiment, the operation of selecting a ContactInfo may enable load balancing, fail-over, and/or quality-of-service (QoS). In one embodiment, load balancing may be supported by having the ContactInfo list contain ContactInfos for multiple destinations (e.g., server replicas). A load balancing policy may be responsible for selecting an appropriate ContactInfo (i.e., destination) for each message. In one embodiment, QoS may be supported by picking the ContactInfo that guarantees the QoS required by the message. In one embodiment, Failover may be supported by having the remoting infrastructure pick another ContactInfo if communication with a previous pick fails. In one embodiment, when handling failover, the Delegate may notify the iterator that communication using the current ContactInfo failed (to help make decisions about future messages) and then the Delegate may call "next" on the iterator to get another ContactInfo.

A ContactInfo on a remoting system client, such as ContactInfo 180 of FIG. 1 and ContactInfo 202A of FIG. 2, represents an encoding, protocol, transport (EPT) combination supported by a destination of the remoting system client. In one embodiment, the ContactInfo may serve as a factory for specific interface instances including one or more of, but not limited to, a specific Encoder (e.g., encoder 130 of FIG. 1), MessageDispatcher (e.g., MessageDispatcher 160 of FIG. 1), and Connection (e.g., Connection 150 of FIG. 1). This factory functionality of ContactInfo enables a single programming model to be used with multiple EPTs in remoting system clients.

Figure 5:
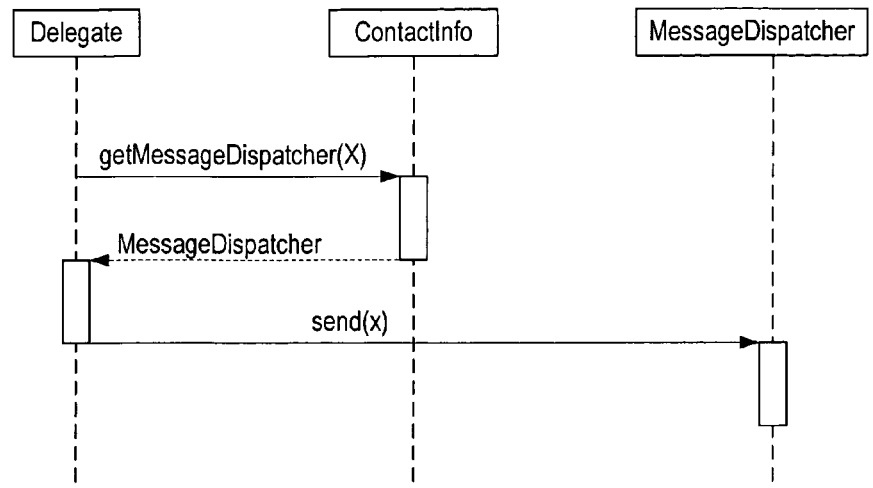
FIG. 5 illustrates the process of a Delegate transferring control to a protocol-specific MessageDispatcher in a remoting system client according to one embodiment.

In one embodiment, after the Delegate obtains a specific ContactInfo, the Delegate may use that ContactInfo to obtain a protocol-specific MessageDispatcher on the remoting system client. The Delegate may then transfer control to the protocol-specific MessageDispatcher, as illustrated in FIG. 5.

Figure 6:
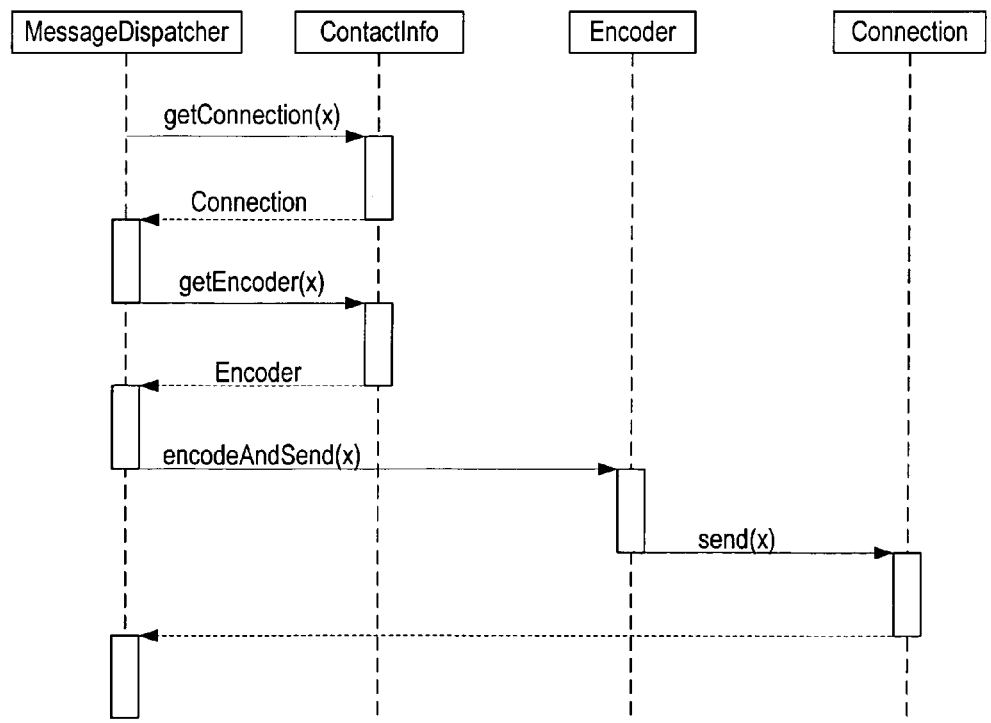
FIG. 6 illustrates operations of the MessageDispatcher in a remoting system client according to one embodiment.

FIG. 6 illustrates the responsibilities of the MessageDispatcher on a remoting system client according to one embodiment. The MessageDispatcher may use the chosen ContactInfo to obtain a transport-specific Connection. If the Connection cannot be obtained, an exception returns control to the generic Delegate so it may get another ContactInfo and try again. The exception may only flow out to the client in the case that attempts to obtain a connection for all available ContactInfos for the destination fails.

Note that, in one embodiment, the Connection may be obtained in the protocol-specific MessageDispatcher rather than the generic Delegate since different protocols support different types of connection management. For example, IIOP allows message multiplexing, so if a connection already exists, one can be obtained from a cache, whereas, for HTTP, a new connection may be needed for each message. The important point is the ability to select different MessageDispatchers and Connections via ContactInfo rather than specific details of the control enabled by a particular MessageDispatcher or the type of the Connection.

In one embodiment, the MessageDispatcher may use ContactInfo to obtain an Encoder. The MessageDispatcher may then provide to the Encoder the (meta)data to be encoded and sent. The Encoder may either stream the data as it encodes it (e.g., fragmentation), or alternatively may encode the entire message and then send the encoded message on the Connection. This provides the ability the select different Encoders via ContactInfo independent of the details of other blocks.

In one embodiment, during or after encoding, the encoded data may have other operations applied such as compression, encryption or checksumming. In one embodiment, these types of operations on encoded data may be performed in the Encoders to avoid traversing the data multiple times. In another embodiment, plug-in encoded-level interceptors may be provided independently of the Encoders to perform these types of operations on encoded data.

In one embodiment, if a reply is expected, the MessageDispatcher may encapsulate the details of waiting for a reply. The details of "waiting" may depend on the protocol in use (e.g., may depend on the implementation of the specific MessageDispatcher isolated from other blocks). For example, HTTP MessageDispatchers may just block on read, and then let the stack unwind on reply. Co-located MessageDispatchers may use the client thread to handle the destination dispatch and then unwind on reply. Multiplexed MessageDispatchers (e.g., GIOP) may wait on a condition. A Multiplexed Connection may then use the ContactInfo that created it to obtain the correct multiplexed MessageDispatcher that would read a correlation ID to signal the waiting thread. In one embodiment, details such as these may be encapsulated in the MessageDispatcher and isolated from the rest of the remoting system blocks to enable the system to adapt to new protocols and to reuse common code.

Figure 7:
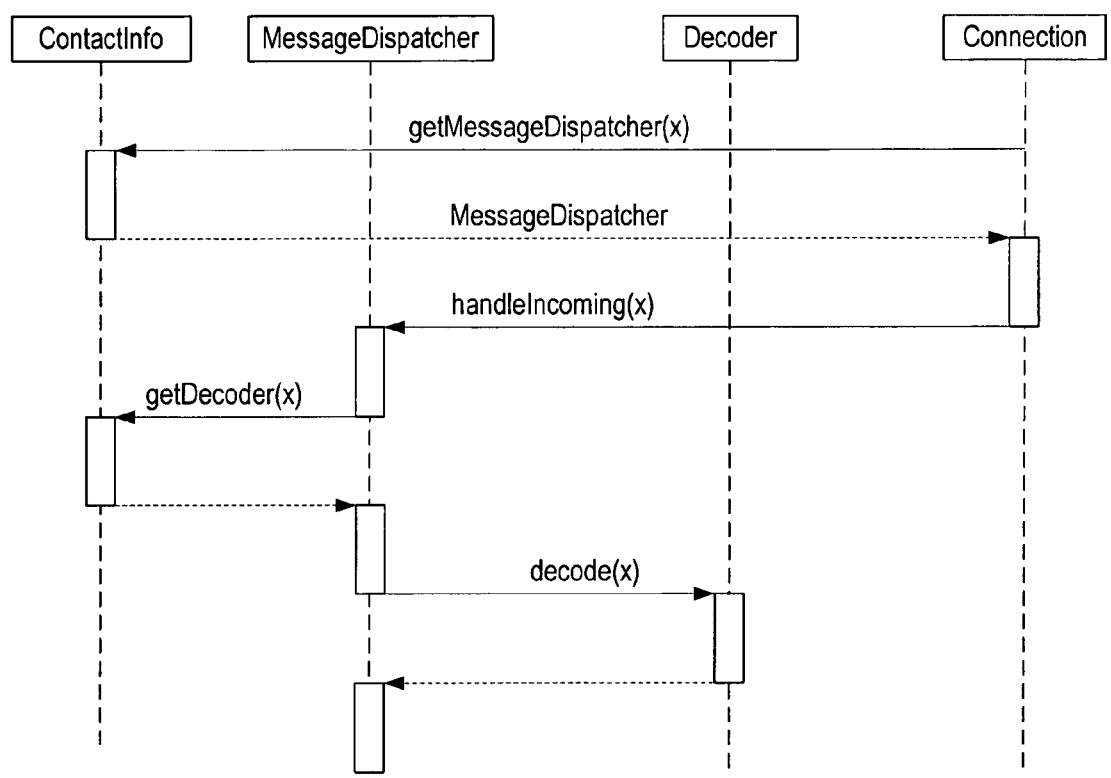
FIG. 7 illustrates the process of replying to a message in a remoting system client according to one embodiment.

In one embodiment, once the appropriate MessageDispatcher gains control (via unwind or signal), it uses ContactInfo to obtain a Decoder to decode the reply (if a reply is expected) and put the reply data in the MessageInfo for return to the client. A reply scenario according to one embodiment is illustrated in FIG. 7.

Implementing an embodiment of the ContactInfo mechanism within the PEPt remoting architecture isolates changing details within the appropriate blocks of the PEPt remoting architecture so that the system as a whole may function in a consistent manner despite evolutionary and dynamic changes. The ContactInfo mechanism may be used to select appropriate EPT combinations for particular messages to particular destinations and to generate the appropriate encodings, protocols and transports to package and transmit the messages "over the wire" to the destination and, if replies are expected, to receive and handle the replies.

Embodiments of the ContactInfo mechanism and the PEPt remoting architecture may be used, for example, in remoting system clients in an RMI system to support CDR/IIOP and SOAP/HTTP. As another example, embodiments of the ContactInfo mechanism and the PEPt remoting architecture may be used to integrate ASN.1/HTTP into JAX-RPC on remoting system clients. Note that these examples are not intended to be limiting; embodiments of the ContactInfo mechanism and the PEPt remoting architecture may be used in remoting system clients in other types or combinations of remoting systems, and in addition, embodiments of the ContactInfo mechanism may be used with other remoting architectures than the PEPt remoting architecture.

Embodiments of the ContactInfo mechanism may be used to provide the client-side extensibility point in the PEPt remoting architecture that allows a single consistent remoting system to evolutionary and adaptively change encodings, protocol and transports. The high-level view of remoting systems provided for remoting system clients by ContactInfo and PEPt abstracts many details such as component frameworks, threading, and thread and connection pools. PEPt focuses its attention on the largest building blocks of a remoting system and keeps the number of blocks to a minimum in order to guide the overall structuring of the remoting system client.

Figure 8:
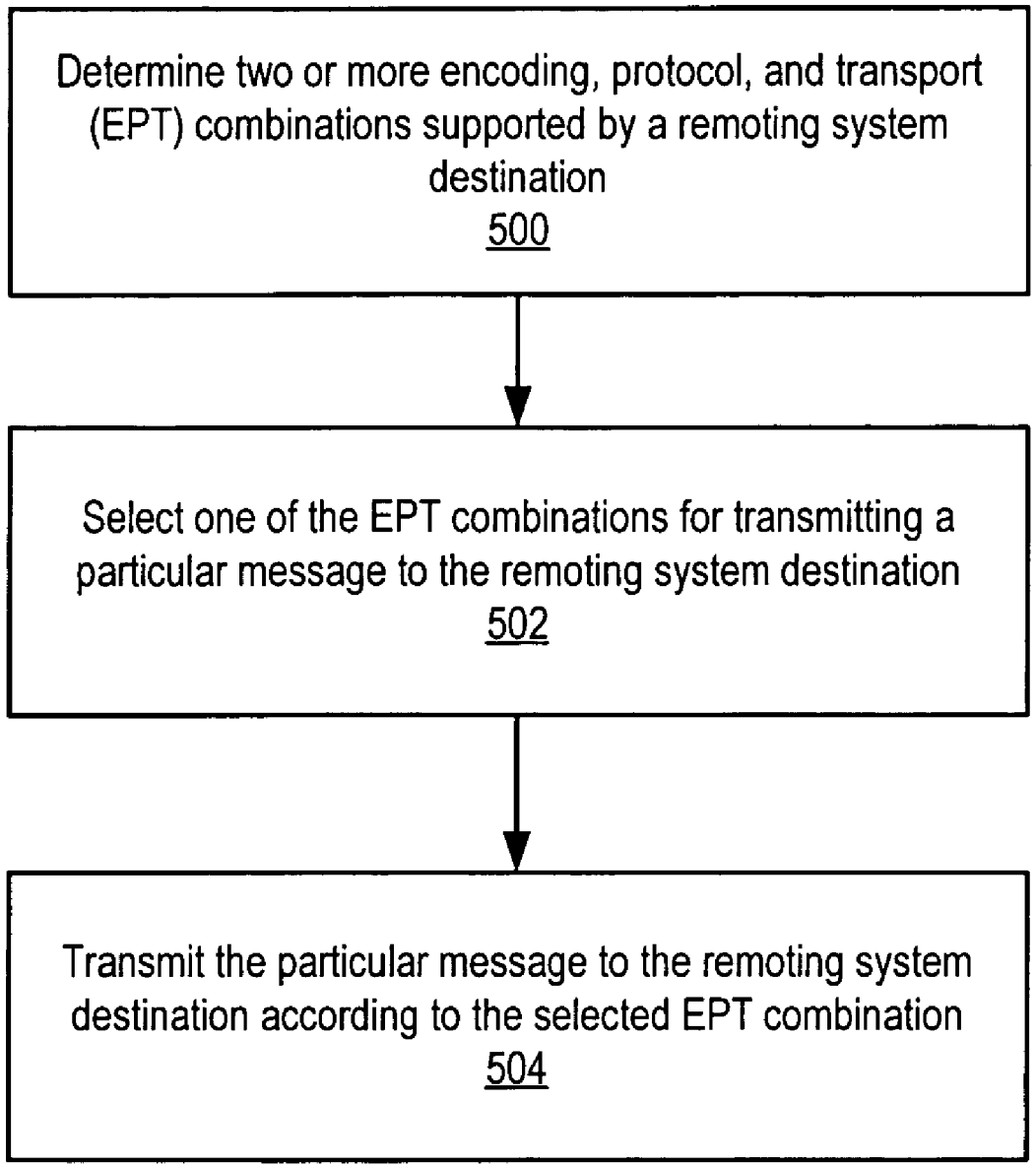
FIG. 8 is a flowchart of a method of operation of a ContactInfo mechanism in a remoting system client according to one embodiment.

FIG. 8 is a flowchart of a method of operation of a ContactInfo mechanism in a remoting system client according to one embodiment. As indicated at 500, two or more encoding, protocol, and transport (EPT) combinations supported by a remoting system destination (e.g., a remoting system server) may be determined. In one embodiment, the remoting system destination may advertise the EPT combinations, and the remoting system client may discover the published advertisements for the EPT combinations.

As indicated at 502, the ContactInfo mechanism may select one of the EPT combinations for transmitting a particular message to the remoting system destination. The ContactInfo mechanism may then transmit the particular message to the remoting system destination according to the selected EPT combination.

In one embodiment, the ContactInfo mechanism may generate a specific encoder, protocol handler and connection for the remoting system client according to the selected EPT combination to transmit the particular message. In one embodiment, the ContactInfo mechanism may generate a specific decoder on the remoting system client for messages received from the remoting system destination in response to the transmitted message. In one embodiment, the remoting system client may be implemented according to a Presentation, Encoding, Protocol, and Transport (PEPt) remoting architecture, and the encoder is part of an encoder block of the PEPt architecture, the protocol handler is part of a protocol block of the PEPt architecture, and the connection is part of a transport block of the PEPt architecture.

To transmit a different message, the ContactInfo mechanism may select a different one of the EPT combinations for transmitting the different message to the remoting system destination from the remoting system client and transmit the different message to the remoting system destination according to the different EPT combination. In one embodiment, the ContactInfo mechanism may generate a different encoder, protocol handler and/or connection for the remoting system client according to the different EPT combination to transmit the different message.

In one embodiment, if only one or two of protocol, encoding, and transport are different in the different EPT combination to transmit the different message, the ContactInfo mechanism may only change the affected parts of the remoting system client to implement the different EPT combination to transmit the different message, without affecting the parts of the remoting system client that are the same in the two EPT combinations. Thus, if only the protocol is different, then the ContactInfo mechanism may only replace the protocol handler (MessageDispatcher). If only the encoding is different, then the ContactInfo mechanism may only replace the encoder. If only the transport is different, then the ContactInfo mechanism may only replace the connection. If the protocol and transport have changed, then the ContactInfo mechanism may replace the protocol handler and connection, without affecting the encoder, and so on.

Figure 9:
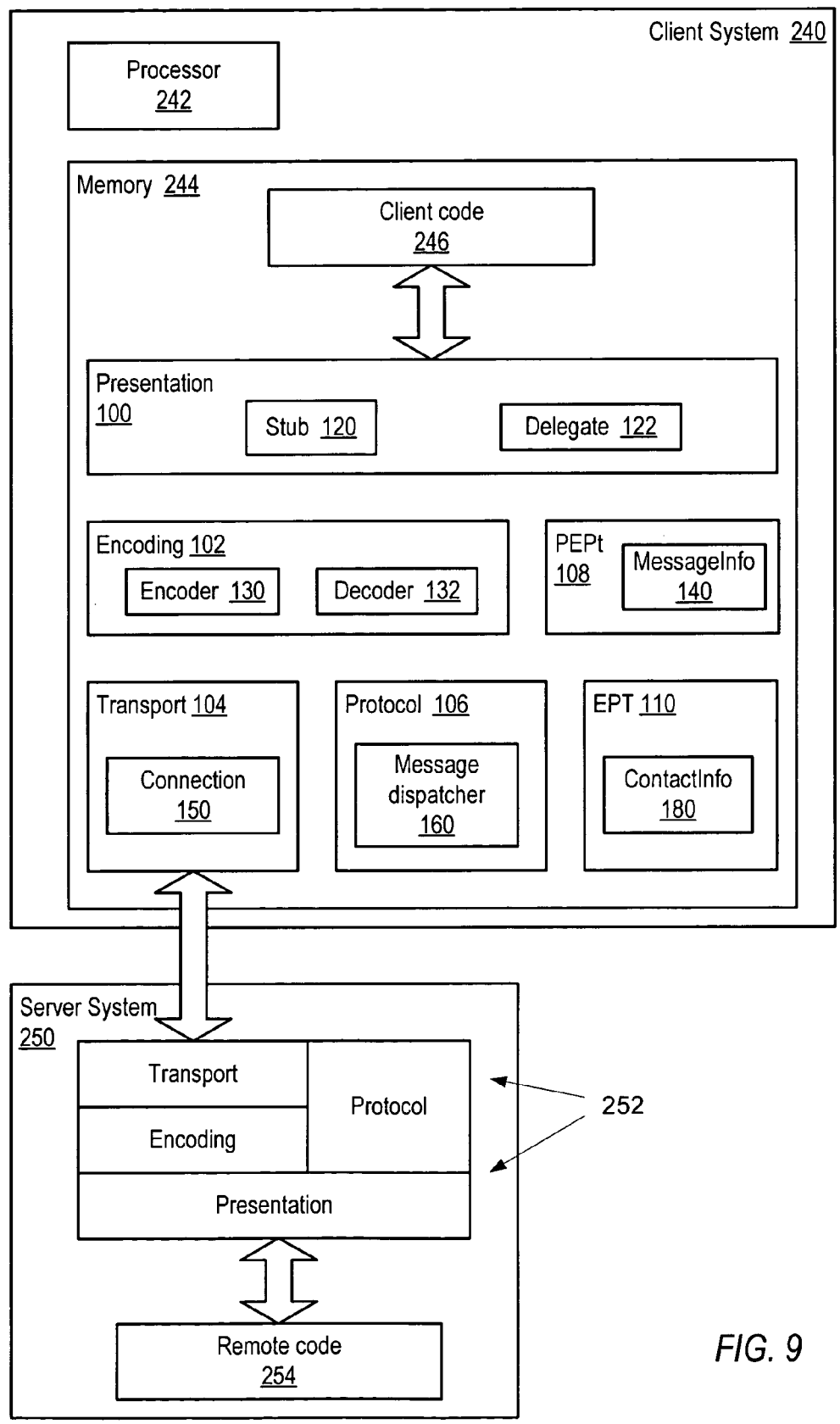
FIG. 9 illustrates a system implementing an exemplary PEPt client-side architecture including a ContactInfo mechanism according to one embodiment.

FIG. 9 illustrates a system implementing an exemplary PEPt client-side architecture including a ContactInfo mechanism according to one embodiment. Client system 240 may be any of various types of devices, including, but not limited to, a personal computer system, desktop computer, laptop or notebook computer, mainframe computer system, workstation, network computer, Personal Digital Assistant (PDA), cell phone, pager, smart appliances or other suitable device. In general, client system 240 may be any device with a digital heartbeat. Client system 240 may include at least one processor 242. The processor 242 may be coupled to a memory 244. Memory 244 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Client system 240 may include, in memory 244, an implementation of a PEPt client-side architecture including a ContactInfo mechanism, and may include presentation 100, encoding 102, protocol 104, transport 106, PEPt 108, and EPT 110 blocks, such as those described for FIG. 1. Client system 240 may also include, in memory, client code 246 for interacting with the PEPt client-side implementation via presentation block 100. Client system 240 may couple over a network via one or more wired or wireless network interfaces to one or more other devices such as server system 250 which may, but do not necessarily, include an implementation of a PEPt server-side architecture 252. Server system 250 may include remote code 254 to be accessed and/or invoked by the client-side implementation of the PEPt remoting architecture on client system 240.

While FIG. 9 illustrates an exemplary scenario in which both client system 240 and server system 250 include an implementation of a PEPt architecture, with the client-side implementation including a ContactInfo mechanism as described herein, note that, in one embodiment, a client system 240 using the PEPt architecture including a ContactInfo mechanism may communicate with a server system using another remoting architecture as long as both systems agree on the underlying wire protocol.

As previously mentioned, one embodiment may provide a mechanism to isolate encoding changes in remoting system clients. The mechanism may enable a message exchange to dynamically change the encoding in use on the remoting system client without the need to change other parts of the remoting system client such as presentation, protocols and/or transport. In one embodiment, if a ContactInfo object has generated the components or interfaces to support an EPT combination including a specific encoder, protocol handler and connection on the remoting system client, and the ContactInfo mechanism switches to a different ContactInfo object to support a different EPT combination on the remoting system client where only the Encoding part of the combination is different from the EPT combination currently in use on the remoting system client, the ContactInfo mechanism may selectively replace only the components or interfaces on the remoting system client necessary to handle the different encoding (e.g., the Encoder) and not any instances of components or interfaces that are the same in the new EPT as in the prior EPT, such as the protocol handler and connection.

One embodiment may provide a mechanism to isolate protocol changes in remoting system clients. The mechanism may enable a message exchange to dynamically change the protocol in use on the remoting system client without the need to change other parts of the remoting system client such as presentation, encoding and/or transport. In one embodiment, if a ContactInfo object has generated the components or interfaces to support an EPT combination including a specific encoder, protocol handler and connection on the remoting system client, and the ContactInfo mechanism switches to a different ContactInfo object to support a different EPT combination on the remoting system client where only the Protocol part of the combination is different from the EPT combination currently in use on the remoting system client, the ContactInfo mechanism may selectively replace only the components or interfaces on the remoting system client necessary to handle the different Protocol (e.g., the Protocol Handler) and not any instances of components or interfaces that are the same in the new EPT as in the prior EPT, such as the encoder and connection.

One embodiment may provide a mechanism to isolate transport changes in remoting system clients. The mechanism may enable a message exchange to dynamically change the transport in use on the remoting system client without the need to change other parts of the remoting system client such as presentation, encoding, and/or protocol. In one embodiment, if a ContactInfo object has generated the components or interfaces to support an EPT combination including a specific encoder, protocol handler and connection on the remoting system client, and the ContactInfo mechanism switches to a different ContactInfo object to support a different EPT combination on the remoting system client where only the transport part of the combination is different from the EPT combination currently in use on the remoting system client, the ContactInfo mechanism may selectively replace only the components or interfaces on the remoting system client necessary to handle the different transport (e.g., the connection) and not any instances of components or interfaces that are the same in the new EPT as in the prior EPT, such as the protocol handler and encoder.

Remoting System Implementation

The above described embodiments of a client-side mechanism for supporting the dynamic and adaptive alternating of encodings, protocols, and/or transports in remoting systems. This section further describes the implementation of embodiments of the client-side mechanism in remoting systems including, but not limited to, messaging and RPC remoting systems.

Figure 10:
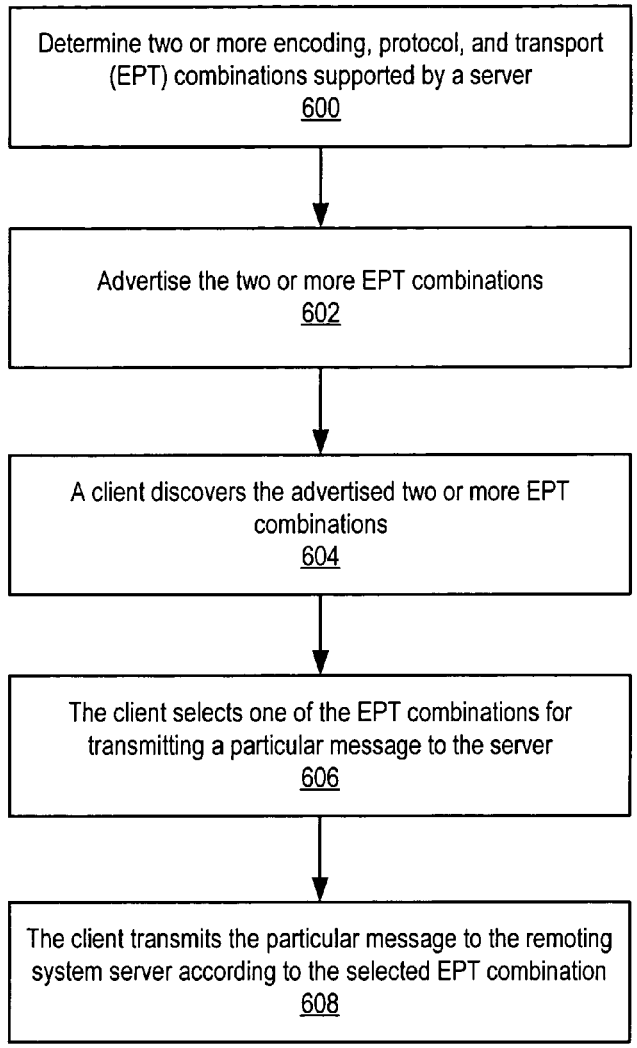
FIG. 10 is a flowchart of a method for a remoting system client to obtain and use a particular encoding, protocol, and transport (EPT) combination supported by a remoting system server according to one embodiment.
Figure 11:
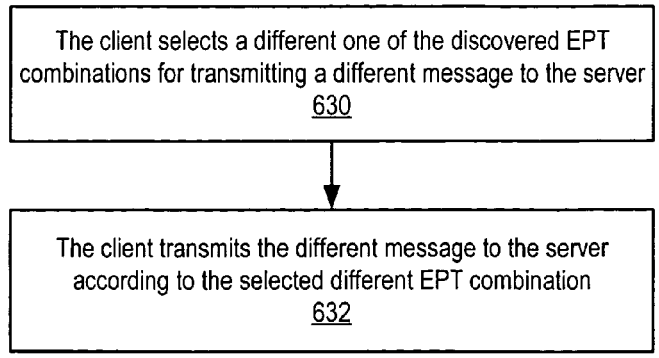
FIG. 11 is a flowchart of a method for a remoting system client to switch to a different encoding, protocol, and transport (EPT) combination supported by a remoting system server according to one embodiment.

FIGS. 10-11 are flowcharts of a method for dynamically and adaptively alternating encodings, protocols, and/or transports in a remoting system client according to one embodiment. In these flowcharts, in one embodiment, the remoting system server may be implemented according to a Presentation, Encoding, Protocol, and Transport (PEPt) remoting architecture. In one embodiment, the remoting system client may be implemented according to a PEPt remoting architecture. In one embodiment, both the remoting system client and server may be implemented according to a PEPt remoting architecture.

FIG. 10 is a flowchart of a method for a remoting system client to obtain and use a particular encoding, protocol, and transport (EPT) combination supported by a remoting system server according to one embodiment. As indicated at 600, a remoting system server may determine two or more supported encoding, protocol, and transport (EPT) combinations. In one embodiment, the remoting system server may generate a list of EPT combinations supported by the server. As indicated at 602, the server may then advertise the two or more EPT combinations, for example by placing that information in an object reference or by making the information available in a registry. Some embodiments may use other mechanisms to advertise EPT combinations.

As indicated at 604, the remoting system client may discover the two or more EPT combinations advertised by the server. In one embodiment, the remoting system client may generate a list of ContactInfo objects from this advertised information, with one ContactInfo object for each EPT combination. At some point, the remoting system client may generate a message for the remoting system server. For example, the message may be an invocation message for some function of a service or application hosted by the remoting system server. As indicated at 606, the remoting system client may select one of the discovered EPT combinations for transmitting the particular message to the remoting system server. In one embodiment, to select one of the discovered EPT combinations, the remoting system client may select one of the ContactInfo objects corresponding to the desired EPT combination from the list of ContactInfo objects.

As indicated at 608, the remoting system client may then transmit the particular message to the remoting system server according to the selected EPT combination. In one embodiment, to transmit the particular message according to the selected EPT combination, the remoting system client may generate a specific encoder, protocol handler and/or connection according to the selected EPT combination. In one embodiment, a selected ContactInfo object may act as a factory for encoders, protocol handlers, and/or connections for the selected EPT combination. Other embodiments may generate one or more other infrastructure interfaces and/or objects on the remoting system client to transmit the particular message. In one embodiment, the remoting system client may be implemented according to a Presentation, Encoding, Protocol, and Transport (PEPt) remoting architecture, and the encoder is part of an encoder block of the PEPt architecture, the protocol handler is part of a protocol block of the PEPt architecture, and the connection is part of a transport block of the PEPt architecture.

FIG. 11 is a flowchart of a method for a remoting system client to switch to a different encoding, protocol, and transport (EPT) combination supported by a remoting system server according to one embodiment. As indicated at 630, the remoting system client may select a different one of the discovered EPT combinations for transmitting a different message to the remoting system server. In one embodiment, to select a different one of the discovered EPT combinations, the remoting system client may select one of the ContactInfo objects corresponding to the different EPT combination from the list of ContactInfo objects.

As indicated at 632, the remoting system client may then transmit the different message to the remoting system server according to the selected different EPT combination. In one embodiment, to transmit the different message according to the selected EPT combination, the remoting system client may generate a specific encoder, protocol handler and/or connection according to the selected EPT combination. In one embodiment, a selected ContactInfo object may act as a factory for encoders, protocol handlers, and/or connections for the selected EPT combination. Other embodiments may generate one or more other infrastructure interfaces and/or objects on the remoting system client to transmit the different message. In one embodiment, the remoting system client may only generate infrastructure interfaces and/or objects necessary to support changed portions of the EPT combination from the original EPT combination without affecting infrastructure interfaces and/or objects that support portions of the EPT combination that have not changed. For example, if only the transmission portion of the new EPT combination is different from the original EPT combination, then only a new connection may be generated to replace the original connection without affecting the encoder and protocol handler already in place.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A remoting system, comprising:
a server hardware device configured to implement a remoting system server, wherein the remoting system server is configured to:
determine multiple distinct encoding, protocol, and transport (EPT) combinations from among multiple data encodings, multiple protocols, and multiple transports supported by the remoting system server; and
advertise the multiple EPT combinations for discovery by clients;
a client hardware device configured to implement a remoting system client, wherein the remoting system client is configured to:
discover the multiple EPT combinations advertised by the remoting system server;
select one of the discovered EPT combinations for transmitting a particular message to the remoting system server;
generate, on the remoting system client and according to the selected EPT combination, a specific encoder configured to encode representations of data types as outgoing messages on an interconnect, a specific protocol handler configured to frame the encodings to denote the intent of the outgoing messages, and a specific connection configured to move the encoded and protocol framed outgoing messages from the remoting system client to the remoting system server over the interconnect;
transmit the particular message to the remoting system server according to the selected EPT combination;
select a different one of the discovered EPT combinations for transmitting a different message to the remoting system server; and
transmit the different message to the remoting system server according to the selected different EPT combination;
wherein the functionality of each of the encoder, the protocol handler, and the connection is isolated from the functionality of others of the encoder, the protocol handler, and the connection so that program instructions for each can be replaced or modified without replacing or modifying program instructions for any of the others.

2. The remoting system as recited in claim 1, wherein the remoting system server is further configured to receive the particular message from the remoting system client according to the selected EPT combination.

3. The remoting system as recited in claim 1, wherein the remoting system client is further configured to generate a specific decoder for receiving response messages from the remoting system server according to the selected EPT combination.

4. The remoting system as recited in claim 1, wherein the remoting system server is implemented according to a Presentation, Encoding, Protocol, and Transport (PEPt) remoting architecture.

5. The remoting system as recited in claim 1, wherein the remoting system client is implemented according to a Presentation, Encoding, Protocol, and Transport (PEPt) remoting architecture.

6. The remoting system as recited in claim 1, wherein the remoting system is implemented according to a Presentation, Encoding, Protocol, and Transport (PEPt) remoting architecture.

7. A system, comprising:
a processor; and
a memory comprising program instructions, wherein the program instructions are executable by the processor to implement a remoting system client configured to:
determine multiple encoding, protocol, and transport (EPT) combinations from among multiple data encodings, multiple protocols, and multiple transports supported by a destination for messages;
generate a distinct Contact Information (ContactInfo) object for each of the multiple EPT combinations determined from among multiple data encodings, multiple protocols, and multiple transports supported by the destination; and
select one of the ContactInfo objects for transmitting a particular message to the destination according to the particular EPT combination of the ContactInfo object;
wherein the selected ContactInfo object is configured to generate a specific encoder, protocol handler, and connection to transmit the particular message, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the destination over the interconnect;
wherein the functionality of each of the encoder, the protocol handler, and the connection is isolated from the functionality of others of the encoder, the protocol handler, and the connection so that program instructions for each can be replaced or modified without replacing or modifying program instructions for any of the others; and
wherein the remoting system client is further configured to select a different one of the ContactInfo objects for transmitting a different message to the destination according to a different EPT combination.

8. The system as recited in claim 7, wherein the generated encoder, protocol handler, and connection are configured to transmit the message to the destination according to the particular EPT combination.

9. The system as recited in claim 7, wherein the selected ContactInfo object is further configured to generate a specific decoder for messages received from the destination in response to the transmitted message.

10. The system as recited in claim 7, wherein the program instructions are further executable by the processor to implement the remoting system client according to a Presentation, Encoding, Protocol, and Transport (PEPt) remoting architecture, wherein the encoder is part of an encoder block of the PEPt architecture, wherein the protocol handler is part of a protocol block of the PEPt architecture, and wherein the connection is part of a transport block of the PEPt architecture.

11. The system as recited in claim 7, wherein, to determine multiple encoding, protocol, and transport (EPT) combinations from among multiple data encodings, multiple protocols, and multiple transports supported by a destination for messages, the remoting system client is further configured to discover advertisements for the EPT combinations published by the destination.

12. The system as recited in claim 7, wherein the destination is a remoting system server.

13. The system as recited in claim 7, wherein the selected different ContactInfo object is configured to generate a different specific encoder, protocol handler, and connection to transmit the different message.

14. The system as recited in claim 7, wherein only
the encoding part of the different EPT combination is different from the original EPT combination, and wherein the selected different ContactInfo object is configured to generate a different specific encoder to transmit the different message without affecting the original protocol handler and connection.

15. The system as recited in claim 7, wherein only
the protocol part of the different EPT combination is different from the original EPT combination, and wherein the selected different ContactInfo object is configured to generate a different specific protocol handler to transmit the different message without affecting the original encoder and connection.

16. The system as recited in claim 7, wherein only the transport part of the different EPT combination is different from the original EPT combination, and wherein the selected different ContactInfo object is configured to generate a different specific connection to transmit the different message without affecting the original encoder and protocol handler.

17. A remoting system client, comprising:
a processor; and
a memory comprising program instructions, wherein the program instructions are executable by the processor to implement a Contact Information (ContactInfo) mechanism configured to:
determine multiple encoding, protocol, and transport (EPT) combinations from among multiple data encodings, multiple protocols, and multiple transports supported by a remoting system destination for messages;
select one of the EPT combinations for transmitting a particular message to the remoting system destination;
generate a specific encoder, protocol handler and connection according to the selected EPT combination to transmit the particular message, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the remoting system destination over the interconnect;
transmit the particular message to the remoting system destination according to the selected EPT combination;
select a different one of the EPT combinations for transmitting a different message to the remoting system destination; and
transmit the different message to the remoting system destination according to the different EPT combination;
wherein the functionality of each of the encoder, the protocol handler, and the connection is isolated from the functionality of others of the encoder, the protocol handler, and the connection so that program instructions for each can be replaced or modified without replacing or modifying program instructions for any of the others.

18. The remoting system client as recited in claim 17, wherein the remoting system client is implemented according to a Presentation, Encoding, Protocol, and Transport (PEPt) remoting architecture, wherein the encoder is part of an encoder block of the PEPt architecture, wherein the protocol handler is part of a protocol block of the PEPt architecture, and wherein the connection is part of a transport block of the PEPt architecture.

19. The remoting system client as recited in claim 17, wherein the ContactInfo mechanism is further configured to generate a specific decoder for messages received from the remoting system destination in response to the transmitted message.

20. The remoting system client as recited in claim 17, wherein the remoting system client is implemented according to a Presentation, Encoding, Protocol, and Transport (PEPt) remoting architecture.

21. The remoting system client as recited in claim 17, wherein, to determine multiple encoding, protocol, and transport (EPT) combinations from among multiple data encodings, multiple protocols, and multiple transports supported by a remoting system destination for messages, the ContactInfo mechanism is further configured to discover advertisements for the EPT combinations published by the destination.

22. The remoting system client as recited in claim 17, wherein the remoting system destination is a remoting system server.

23. A computer implemented method, comprising:
a remoting system server determining multiple encoding, protocol, and transport (EPT) combinations from among multiple data encodings, multiple protocols, and multiple transports supported by the remoting system server;
the remoting system server advertising the multiple EPT combinations;
a remoting system client discovering the advertised multiple EPT combinations;
the remoting system client selecting one of the discovered EPT combinations for transmitting a particular message to the remoting system server;
generating on the remoting system client and according to the selected EPT combination, a specific encoder configured to encode representations of data types as outgoing messages on an interconnect, a specific protocol handler configured to frame the encodings to denote the intent of the outgoing messages, and a specific connection configured to move the encoded and protocol framed outgoing messages from the remoting system client to the remoting system server over the interconnect;
the remoting system client transmitting the particular message to the remoting system server according to the selected EPT combination;
the remoting system client selecting a different one of the discovered EPT combinations for transmitting a different message to the remoting system server; and
the remoting system client transmitting the different message to the remoting system server according to the selected different EPT combination;
wherein the functionality of each of the encoder, the protocol handler, and the connection is isolated from the functionality of others of the encoder, the protocol handler, and the connection so that program instructions for each can be replaced or modified without replacing or modifying program instructions for any of the others.

24. The computer implemented method as recited in claim 23, further comprising the remoting system server receiving the particular message from the remoting system client according to the selected EPT combination.

25. The computer implemented method as recited in claim 23, further comprising the remoting system client generating a specific decoder for receiving response messages from the remoting system server according to the selected EPT combination.

26. The computer implemented method as recited in claim 23, wherein the remoting system server is implemented according to a Presentation, Encoding, Protocol, and Transport (PEPt) remoting architecture.

27. The computer implemented method as recited in claim 23, wherein the remoting system client is implemented according to a Presentation, Encoding, Protocol, and Transport (PEPt) remoting architecture.

28. A computer implemented method, comprising:
determining multiple encoding, protocol, and transport (EPT) combinations from among multiple data encodings, multiple protocols, and multiple transports supported by a remoting system destination for messages;
selecting one of the EPT combinations for transmitting a particular message to the remoting system destination;
generating a specific encoder, protocol handler and connection according to the selected EPT combination to transmit the particular message, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the remoting system destination over the interconnect;
transmitting the particular message to the remoting system destination according to the selected EPT combination;
selecting a different one of the EPT combinations for transmitting a different message to the remoting system destination; and
transmitting the different message to the remoting system destination according to the different EPT combination;
wherein the functionality of each of the encoder, the protocol handler, and the connection is isolated from the functionality of others of the encoder, the protocol handler, and the connection so that program instructions for each can be replaced or modified without replacing or modifying program instructions for any of the others.

29. The computer implemented method as recited in claim 28, wherein said determining, said selecting, said generating, and said transmitting are performed by a remoting system client implemented according to a Presentation, Encoding, Protocol, and Transport (PEPt) remoting architecture, wherein the encoder is part of an encoder block of the PEPt architecture, wherein the protocol handler is part of a protocol block of the PEPt architecture, and wherein the connection is part of a transport block of the PEPt architecture.

30. The computer implemented method as recited in claim 28, further comprising generating a specific decoder for messages received from the remoting system destination in response to the transmitted message.

31. The computer implemented method as recited in claim 28, wherein said determining multiple encoding, protocol, and transport (EPT) combinations from among multiple data encodings, multiple protocols, and multiple transports supported by a remoting system destination for messages comprises discovering advertisements for the EPT combinations published by the remoting system destination.

32. The computer implemented method as recited in claim 28, wherein the remoting system destination is a remoting system server.

33. A computer-accessible storage medium storing program instructions, wherein the program instructions are computer-executable to implement:
a remoting system server determining multiple encoding, protocol, and transport (EPT) combinations from among multiple data encodings, multiple protocols, and multiple transports supported by the remoting system server;
the remoting system server advertising the multiple EPT combinations;
a remoting system client discovering the advertised multiple EPT combinations;
the remoting system client selecting one of the discovered EPT combinations for transmitting a particular message to the remoting system server;
generating on the remoting system client and according to the selected EPT combination, a specific encoder configured to encode representations of data types as outgoing messages on an interconnect, a specific protocol handler configured to frame the encodings to denote the intent of the outgoing messages, and a specific connection configured to move the encoded and protocol framed outgoing messages from the remoting system client to the remoting system server over the interconnect;
the remoting system client transmitting the particular message to the remoting system server according to the selected EPT combination;
the remoting system client selecting a different one of the discovered EPT combinations for transmitting a different message to the remoting system server; and
the remoting system client transmitting the different message to the remoting system server according to the selected different EPT combination;
wherein the functionality of each of the encoder, the protocol handler, and the connection is isolated from the functionality of others of the encoder, the protocol handler, and the connection so that program instructions for each can be replaced or modified without replacing or modifying program instructions for any of the others.

34. The computer-accessible storage medium as recited in claim 33, wherein the program instructions are further computer-executable to implement the remoting system client generating a specific decoder for receiving response messages from the remoting system server according to the selected EPT combination.

35. The computer-accessible storage medium as recited in claim 33, wherein the remoting system server is implemented according to a Presentation, Encoding, Protocol, and Transport (PEPt) remoting architecture.

36. The computer-accessible storage medium as recited in claim 33, wherein the remoting system client is implemented according to a Presentation, Encoding, Protocol, and Transport (PEPt) remoting architecture.

37. A computer-accessible storage medium storing program instructions, wherein the program instructions are computer-executable to implement:
determining multiple encoding, protocol, and transport (EPT) combinations from among multiple data encodings, multiple protocols, and multiple transports supported by a remoting system destination for messages;

selecting one of the EPT combinations for transmitting a particular message to the remoting system destination;
generating a specific encoder, protocol handler and connection according to the selected EPT combination to transmit the particular message, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the remoting system destination over the interconnect;
transmitting the particular message to the remoting system destination according to the selected EPT combination;
selecting a different one of the EPT combinations for transmitting a different message to the remoting system destination; and
transmitting the different message to the remoting system destination according to the different EPT combination;
wherein the functionality of each of the encoder, the protocol handler, and the connection is isolated from the functionality of others of the encoder, the protocol handler, and the connection so that program instructions for each can be replaced or modified without replacing or modifying program instructions for any of the others.

38. The computer-accessible storage medium as recited in claim 37, wherein the program instructions are further computer-executable to implement a remoting system client according to a Presentation, Encoding, Protocol, and Transport (PEPt) remoting architecture, wherein the encoder is part of an encoder block of the PEPt architecture, wherein the protocol handler is part of a protocol block of the PEPt architecture, and wherein the connection is part of a transport block of the PEPt architecture, wherein said determining, said selecting, said generating, and said transmitting are performed by the remoting system client.

39. The computer-accessible storage medium as recited in claim 37, wherein the program instructions are further computer-executable to implement generating a specific decoder for messages received from the remoting system destination in response to the transmitted message.

40. The computer-accessible storage medium as recited in claim 37, wherein, in said determining multiple encoding, protocol, and transport (EPT) combinations from among multiple data encodings, multiple protocols, and multiple transports supported by a remoting system destination for messages, the program instructions are further computer-executable to implement discovering advertisements for the EPT combinations published by the remoting system destination.

41. The computer-accessible storage medium as recited in claim 37, wherein the remoting system destination is a remoting system server.

42. A remoting system client, comprising:
processor;
means for determining multiple encoding, protocol, and transport (EPT) combinations from among multiple data encodings, multiple protocols, and multiple transports supported by a destination for messages;
means for selecting one of the EPT combinations for transmitting a particular message to the destination;
means for generating a specific encoder, protocol handler and connection according to the selected EPT combination to transmit the particular message, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the destination over the interconnect;
means for transmitting the particular message to the destination according to the specific encoder, protocol handler and connection;
means for isolating the functionality of each of the encoder, the protocol handler, and the connection from the functionality of others of the encoder, the protocol handler, and the connection so that program instructions for each can be replaced or modified without replacing or modifying program instructions for any of the others; and
means for switching to a different EPT combination to transmit a different message to the destination.

43. A system, comprising:
a processor; and
a memory comprising program instructions, wherein the program instructions are executable by the processor to implement a remoting system client configured to:
generate a specific encoder, protocol handler and connection to transmit a particular message to a destination system, wherein the encoder, the protocol handler, and the connection are generated according to one of a plurality of Encoding, Protocol, and Transport (EPT) combinations from among multiple data encodings, multiple protocols, and multiple transports supported by the destination system, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the destination system over the interconnect;
select a different one of the plurality of EPT combinations for transmitting a different message to the destination system, wherein only the Encoding part of the EPT combination is different from the original EPT combination implemented on the system; and
generate a different encoder to transmit the different message without affecting the original protocol handler and connection.

44. The system as recited in claim 43, wherein the program instructions are further configured to implement the remoting system client according to a Presentation, Encoding, Protocol, and Transport (PEPt) remoting architecture, wherein the encoder is part of an encoder block of the PEPt architecture, wherein the protocol handler is part of a protocol block of the PEPt architecture, and wherein the connection is part of a transport block of the PEPt architecture.

45. A system, comprising:
a processor; and
a memory comprising program instructions, wherein the program instructions are executable by the processor to implement a remoting system client configured to:
generate a specific encoder, protocol handler and connection to transmit a particular message to a destination system, wherein the encoder, the protocol handler, and the connection are generated according to one of a plurality of Encoding, Protocol, and Transport (EPT) combinations from among multiple data encodings, multiple protocols, and multiple transports supported by the destination system, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the destination system over the interconnect;

select a different one of the plurality of EPT combinations for transmitting a different message to the destination system, wherein only the Protocol part of the EPT combination is different from the original EPT combination implemented on the system; and generate a different protocol handler to transmit the different message without affecting the original encoder and connection.

46. The system as recited in claim 45, wherein the program instructions are further configured to implement the remoting system client according to a Presentation, Encoding, Protocol, and Transport (PEPt) remoting architecture, wherein the encoder is part of an encoder block of the PEPt architecture, wherein the protocol handler is part of a protocol block of the PEPt architecture, and wherein the connection is part of a transport block of the PEPt architecture.

47. A system, comprising:

a processor; and a memory comprising program instructions, wherein the program instructions are executable by the processor to implement a remoting system client configured to:

generate a specific encoder, protocol handler and connection to transmit a particular message to a destination system, wherein the encoder, the protocol handler, and the connection are generated according to one of a plurality of Encoding, Protocol, and Transport (EPT) combinations from among multiple data encodings, multiple protocols, and multiple transports supported by the destination system, wherein the encoder is configured to encode representations of data types as outgoing messages on an interconnect, the protocol handler is configured to frame the encodings to denote the intent of the outgoing messages, and the connection is configured to move the encoded and protocol framed outgoing messages from the remoting system client to the destination system over the interconnect;

select a different one of the plurality of EPT combinations for transmitting a different message to the destination system, wherein only the transport part of the EPT combination is different from the original EPT combination implemented on the system; and generate a different connection to transmit the different message without affecting the original protocol handler and encoder.

48. The system as recited in claim 47, wherein the program instructions are further configured to implement the remoting system client according to a Presentation, Encoding, Protocol, and Transport (PEPt) remoting architecture, wherein the encoder is part of an encoder block of the PEPt architecture, wherein the protocol handler is part of a protocol block of the PEPt architecture, and wherein the connection is part of a transport block of the PEPt architecture.

* * * * *